3,153,102
PROCESS FOR THE PREPARATION OF
1,3,5-TRIVINYLBENZENE
Theodore E. Bockstahler, Moorestown, N.J., and Charles H. McKeever, Meadowbrook, and Joseph W. Nemec, Rydal, Pa., assignors to Rohm & Haas Company, Philadelphia, Pa., a corporation of Delaware
No Drawing. Filed Oct. 30, 1962, Ser. No. 234,244
6 Claims. (Cl. 260—669)

This case deals with a process for the preparation of 1,3,5-trivinylbenzene in high yields and in a high degree of purity. It further deals with a one-step process for the preparation of 1,3,5-trivinylbenzene.

The present process deals with a reaction between specific alcohols and 1,3,5-triacetylbenzene to produce 1,3,5-trivinylbenzene. The alcohols employed can be ethanol or secondary alkanols of up to eight carbon atoms, preferably up to four carbon atoms, including cyclic alkanols such as cyclohexanol. The preferred alcohol is isopropanol or ethanol. Highest yields of highest purity product are obtained with isopropanol. There are employed at least three equivalents of the alcohol for one equivalent of 1,3,5-triacetylbenzene in order to assure maximum yields of desired product. If desired, the alcohol may be employed in excess of the above-mentioned ratio and amounts of alcohol to 1,3,5-trivinylbenzene in a molar ratio of up to nine to one have been advantageously employed.

Temperatures in the range of 220 to 350° C. are required, preferably 225° to 300° C. The reaction may be conducted at atmospheric pressure and possibly slightly above but better results are obtained when the pressure is no greater than about atmospheric. Preferred results are obtained at pressures less than atmospheric, such as about 30 to 60 mm. of mercury.

The reaction is conducted in the presence of alumina that has a surface area of at least 10 square meters per gram, preferably at least 100 square meters per gram. For reasons not completely understood, silica and similar oxide catalysts are ineffectual in the present process as is alumina having a surface area below 10 square meters per gram.

The process is conducted by passing the alcohol and the 1,3,5-triacetylbenzene into a reactor containing the alumina. Suitable in this respect is a tube or similar container packed with the alumina. It is important for the maximum success of the present process that the alcohol and the 1,3,5-triacetylbenzene both be in the vapor state when introduced into the reaction chamber. This is readily achieved by passing gaseous alcohol or vapors of an inert carrier such as helium, nitrogen, steam, or the like over molten 1,3,5-triacetylbenzene.

It is desirable to remove the 1,3,5-trivinylbenzene from the reaction chamber promptly on its formation otherwise it tends to polymerize. To achieve this result, it is sometimes necessary to introduce vapors of an inert material such as helium, nitrogen, propylene and the like. The product is readily condensed and collected in a high state of purity with only small amounts of water present, which are readily removed by mechanical means. Other by-products of the reaction are volatilized but can be collected if desired for economical reasons. Nevertheless, the more volatile compounds are readily separable from the desired product of the present process.

Yields consistently in excess of 60% by weight based on the 1,3,5-triacetylbenzene supplied are obtained. The purity of the product averages 90 to 95% and higher. Occasionally there are obtained small amounts of divinylethylbenzene and vinyldiethylbenzene as by-products. Vinyldiethylbenzene is rarely encountered, and then only in trace amounts, and the divinylethylbenzene while present in at the most in small amounts is a valuable cross-linking monomer. It is as a cross-liking monomer that the product of the present process finds its principal use, being useful in the formation of ion exchange resins. Therefore, even though occasionally there are small amounts of divinylethylbenzene found in the 1,3,5-trivinylbenzene this is no appreciable deterrent to the purposes of the present invention.

The process of this invention may be more fully understood from the following examples which are offered by way of illustration and not by way of limitation. Parts by weight are used throughout.

*Example 1*

An iron tube one inch in diameter and 6 feet long is filled with 800 ml. of activated alumina having a surface area of 100 square meters per gram, with a particle size of ¼"–8 mesh in size. Mixed vapors of isopropanol, 1,3,5-triacetylbenzene, and a trace of inhibitor (hydroquinone) are passed over the catalyst at 235° C. at a total flow rate of 0.0032 g. moles per 100 ml. catalyst per minute. The mole ratio of alcohol to ketone is 8.56 to 1, and a pressure of 30 to 60 mm. of Hg is maintained. After 2.3 hours, the reaction is interrupted and 97.2 parts of condensate from a cold water condenser is removed. Upon separation of the water layer, 50.2 parts of 1,3,5-trivinylbenzene remains, $n_D^{25}$ 1.5932. This represented a conversion (and yield) of 76.77% of theory based on the triacetylbenzene supplied. Analysis by bromine number, hydrogenation, C-H composition, and vapor phase chromatography revealed the crude product to be 95% pure trivinylbenzene. This monomer was subsequently shown to be quite suitable as a crosslinking agent in typical polymerization systems without further treatment.

Similar results are obtained when there are employed alumina having a surface area of 360 square meters per gram and 2-octanol in place of isopropanol.

*Example 2*

To the catalyst described in Example 1 there is fed, at atmospheric pressure, a mixture of vapors made up of isopropanol, 1,3,5-triacetylbenzene, hydroquinone and nitrogen. The respective amounts are 350 ml. per hour, 8.3 g. per hour, 1 part total, and 10 liters per minute. After 5.7 hours the feed is stopped and the layers in the condensate from the ice water condenser are separated. The 1,3,5-trivinylbenzene weighs 27.1 parts, 74.8% of theory based on the 1,3,5-triacetylbenzene fed, and has an $n_D^{25}$ value of 1.5945.

In a similar manner similar results are obtained when there are employed ethanol and alumina having a surface area of 10 square meters per gram.

We claim:

1. A process for the preparation of 1,3,5-trivinylbenzene comprising reacting 1,3,5-triacetylbenzene and an alcohol selected from the class consisting of ethanol and secondary alkanols of up to eight carbon atoms in the temperature range of about 220° to 350° C. in the presence of alumina that has a surface area of at least 10 square meters per gram.

2. A process according to claim 1 in which the reaction is conducted at a temperature of about 225° to 300° C.

and the alumina has a surface area of at least 100 square meters per gram.

3. A process according to claim 1 in which the reaction is conducted at substantially no higher than atmospheric pressure.

4. A process according to claim 1 wherein said alcohol and said 1,3,5-triacetylbenzene are both in the vapor state when introduced into the reaction chamber.

5. A process according to claim 1 wherein the reaction is conducted by passing said alcohol in the gaseous state over molten 1,3,5-triacetylbenzene.

6. A process according to claim 1 wherein there is employed vapors of an inert carrier and said 1,3,5-trivinylbenzene is removed from the reaction chamber substantially as soon as it is formed.

References Cited in the file of this patent

J.A.C.S., vol. 72, pages 2037–8 (1950).